United States Patent [19]

Doelves

[11] 4,259,697

[45] Mar. 31, 1981

[54] METHOD FOR IMPROVED REPRODUCTION OF EDGES FORMED BY ENGRAVING OF SCREENED PRINTING FORMS

[75] Inventor: Juergen Doelves, Kiel, Fed. Rep. of Germany

[73] Assignee: Dr. Ing. Rudolf Hell GmbH, Fed. Rep. of Germany

[21] Appl. No.: 939,053

[22] Filed: Sep. 1, 1978

[30] Foreign Application Priority Data

Sep. 6, 1977 [DE] Fed. Rep. of Germany ....... 2739977

[51] Int. Cl.³ .......................... H04N 1/24; H04N 1/40
[52] U.S. Cl. ..................................... 358/299; 358/283
[58] Field of Search .............. 358/296, 298, 299, 283, 358/284, 297, 300, 302, 303

[56] References Cited

U.S. PATENT DOCUMENTS

| | | | |
|---|---|---|---|
| 1,331,770 | 10/1943 | Gano | 358/299 |
| 2,575,546 | 11/1951 | Boyujean, Jr. | 358/299 |
| 2,865,984 | 12/1958 | Moe | 358/80 |
| 2,881,246 | 4/1959 | Fairchild | 358/299 |
| 3,769,455 | 10/1973 | de Voss et al. | 358/299 |
| 3,770,888 | 11/1973 | de Voss et al. | 358/299 |
| 3,904,816 | 9/1975 | Taudt et al. | 358/299 |
| 3,983,319 | 9/1976 | Moe et al. | 358/283 |
| 4,013,829 | 3/1977 | Baar et al. | 358/299 |

FOREIGN PATENT DOCUMENTS

1206681 9/1970 United Kingdom.

*Primary Examiner*—Raymond F. Cardillo, Jr.
*Attorney, Agent, or Firm*—Hill, Van Santen, Steadman, Chiara & Simpson

[57] ABSTRACT

A method for the improved reproduction of edges by engraving of screened printing forms by an electromagnetic engraving member. The engraving member is controlled by a signal obtained by superposition of an image signal and a screening signal. The image signal is derived from scanning an image pattern with a resolution which is twice as great in the scanning direction as that of the printing screen. Based on the higher resolution the image signal is converted into digital principal image values and additional intermediate image values. The principal and the intermediate image values are superimposed onto the screening signal after being converted back into an analog image signal, whereby the principal image values are superimposed at the instances of periodically recurrent amplitude values of the screening signal when the tool of the engraving member has its largest deflections in the direction of the printing form for engraving the cups arranged in the printing screen. Thus, the engraving information for each cup consists of two image values, whereby the cups representing a sharp charge in tone density in the pattern are shifted relatively to the printing screen toward the higher level of density so as to accomplish improved reproduction of edges.

10 Claims, 5 Drawing Figures

METHOD FOR IMPROVED REPRODUCTION OF EDGES FORMED BY ENGRAVING OF SCREENED PRINTING FORMS

BACKGROUND OF THE INVENTION

1. Field of the Invention

This invention relates in general methods and apparatus for producing screen printing forms where the engraving is accomplished with small cups or depressions arranged in a printing screen and the engraving device is driven by an image signal and a screen signal to produce a printing screen and the engraving needle of the engraving means receives periodically recurrenting amplitude variations in the screen signal to produce its largest deflection in the direction of the printing form and where analog image signals obtained by pattern scanning are converted to digital signals at a frequency of the screen signal and subsequently, converted from digital back to analog signals and superimposed for driving the engraving means.

2. Description of the Prior Art

U.S. Pat. No. 4,013,829 describes an engraving machine for producing screen printing forms from patterns. The patterns may be continuous tone patterns, so-called line patterns with writings and line representations or combinations of both.

The pattern to be reproduced which is clamped on a rotary scanning cylinder is scanned by scanning means driven parallel to the axis of the scanning cylinder such that the scanning occurs dot by dot and line by line. Depending on the tonal values of the scanned image points, more or less light is reflected from the pattern into the scanning means and converted there opto-electronically into an image electrical signal which is then converted into a digital signal by means of a scanning cycle sequence.

Subsequently, the digital image signal is modified according to a predetermined logarithm and/or gradation curve by recording with the aid of a programmable read only memory (PROM) such that the gradation curve is oriented according to the subsequent printing process and the desired editorial changes of the reproduction relative to the original.

The modified digital image signal then is reconverted into an analog image signal and supplied to an electromagnetic engraving means which has an engraving pin that serves as the cutting tool said engraving means moves axially along a printing cylinder so as to engrave the cups point by point and line by line.

During the engraving of the printing form, the engraving means engraves a sequence of cups or depressions arranged seamlessly in a printing screen and the depth of the depressions or cups depend in each case on the tonal value of the associated image dot.

For the actual screening, a screen signal whose frequency depends on the printing screen to be recorded and the surface speed of the printing cylinder is superimposed on the analog image signal.

While the screen signal generates a vibrating cutting motion of the engraving pin corresponding with the printing screen and determines the depth or moments for the engraving of the cups or depressions, the momentary image signal determines the depth of penetration of the engraving pin into the particular cup being formed.

The engraved printing cylinder forms the printing form for the later printing process in a photogravure rotary printing machine.

The exact reproduction of edges or sharp changes in tone density in the pattern represents a particular problem in the production of screen printing forms. In the engraving system described in U.S. Pat. No. 4,013,829, the positions of the cups on the printing form are predetermined by the position on the printing screens. On the other hand, while scanning the change in tone density lines extend arbitrarily with regard to the scanning screen which is congruent with the printing screen to be recorded. Fine courses of contours, therefore, can be reproduced only definitely with a rigid cup arrangement. For example, fine contours extending obliquely to the scanning direction illustrate disturbing staircase like formations.

Additionally, in the engraving system described in U.S. Pat. No. 4,013,829, the shade values in the range of changes in tone density are reproduced in a varied manner because of the mass of the electro-mechanical engraving means which factor is disadvantageous.

Sharper change in tone density reproduction could be accomplished using finer printing screens. However, a finer printing screen has the drawback that during subsequent printing processes, the transfer of ink from the cups to the printing medium is defective due to smaller cup volume.

U.S. Pat. No. 3,983,319 provides an improvement of the tone density changes by position shifting of screen points within the area of the change.

In the reproduction process for the exposure of screen images upon a photosensitive medium as described in U.S. Pat. No. 3,983,319 for the purpose of a sharper reproduction of the tone density changes those screen points which reproduce tone density changes are so shifted with regard to the positions predetermined by the printing screen that they substantially impinge upon the tone density change lines.

In this reproduction apparatus, patterns are scanned additionally with a photo diode device arranged transversely to the scanning direction. With the presence of a tone density change extending in the scanning direction in the pattern, the photo diode device produces a control signal to the recording apparatus. The control signal deflects a rotary mirror located in the path of the light rays of the luminous source used for the recording such that the screen points are exposed and shifted perpendicularly to the direction of recording.

This reproduction process is subjected to the disadvantage that only tone density change extending in the scanning direction can be reproduced in an improved manner. A precise determination of the location of a tone density change is not possible.

Another disadvantage of this system is that the method is not applicable for electro-magnetic engraving means because the engraving needles cannot be deflected rapidly either in a recording direction or transversely thereto, but merely performs an in and out stroke movement in the radial direction relative to the printing cylinder.

SUMMARY OF THE INVENTION

The present invention solves the problems of the prior art and discloses method and apparatus for the screen production of printing forms wherein a more accurate reproduction of the tone density changes are accomplished and where for improving the reproduction a position shift of the cups can be accomplished with an electro-magnetic engraving means and where the tonal values are reproduced in the range of a tone density without alteration.

Other objects, features and advantages of the invention will be readily apparent from the following description of certain preferred embodiments thereof, taken in conjunction with the accompanying drawings although variations and modifications may be effected without departing from the spirit and scope of the novel concepts of the disclosure.

BRIEF DESCRIPTION OF THE DRAWINGS

FIG. 3b B is a plot of partial jumps 40 and 41 which result after reconverting the digital image values to analog image signals.

FIG. 3a C is a plot indicating the path of an engraving needle from a white level to a black level.

FIG. 3a D illustrates the screen signal which has been phase shifted relative to the scanning pulses.

FIG. 3a E comprises a section view through the surface layer of a printing cylinder.

FIG. 3b A illustrates the image signal plotted with a black to white transfer against time.

FIG. 3b B illustrates the signal path with partial jumps 40 and 41.

FIG. 3b C indicates the path of an engraving needle from a black level S2 to a white level S1.

FIG. 3b D illustrates the screen signal which has been phase shifted relative to the scanning pulses.

FIG. 3b E comprises a sectional view through a surface layer of the printing cylinder.

DESCRIPTION OF THE PREFERRED EMBODIMENTS

Figure 1:
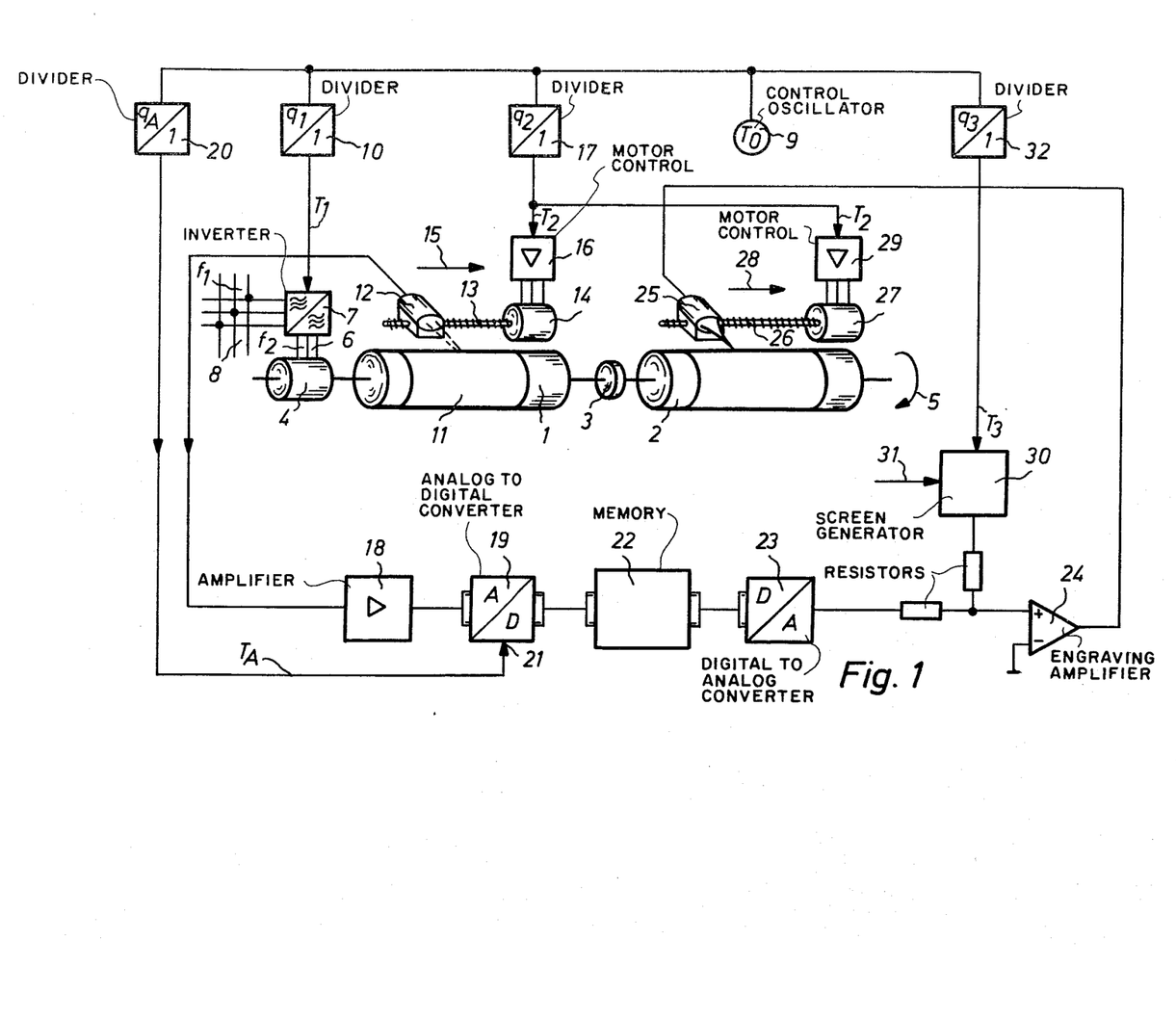
FIG. 1 is a block diagram of an engraving system.

FIG. 1 is a block diagram illustrating an engraving system of the invention in which a scanning cylinder 1 and a printing cylinder 2 are interconnected by way of a clutch 3 and are driven by a synchronous motor 4 as indicated by the arrow 5. The synchronous motor 4 is supplied power from a synthetic network 6 with power at a frequency $f_2$ which is obtained from an inverter 7 from the power supply 8 which has a frequency of $f_2$. The frequency $f_2$ of the synthetic network 6 and the speed of the synchronous motor 4 are functions of the control timing pulse sequence $T_1$ which is supplied to the inverter 7. The timing pulse sequence $T_1$ is obtained from a frequency divider 10 which has a dividing factor of $q_1$ from a control oscillator 9. The dividing factor $q_1$ is adjustable so as to control the speed of the synchronous motor 4 as desired. The inverter 7 which consists of a combination of rectifier and inverse rectifier, as a function of a control pulse sequence, converts a primary power supply with the voltage $U_1$ and the frequency $f_1$ into a secondary power supply with the voltage $U_2$ and the frequency $f_2$, whereby the frequency $f_2$ depends on the frequency of the control pulse sequence. In this manner, a primary power supply of, for example, 220 V and 50 Hz can be converted into a synthetic network with any desired voltage and frequency. This synthetic network drives the motor 4, whereby the speed of the motor 4 can be varied via the frequency. This inverter technology is state of the art and is known for example, from the U.S. Pat. No. 3,582,549. The feed of the motor 4 via the inverter 7 is only cited in the subject matter of the application, as an example.

The utilization of the inverter produces a fixed time relationship between the timing pulse sequence $T_0$ of the output of the control oscillator 9 and the circumferential speed of the cylinders 1 and 2. It is to be understood, of course, that the cylinders 1 and 2 can also be driven by two separate synchronous motors rather than the same synchronous motor if desired. Also, instead of synchronous motors, drive motors of the type which have wow and flutter may also be utilized for driving the cylinders 1 and 2. In the event such motors are used, the control oscillator 9 is designed as an impulse transmitter which is connected to the shaft driving the cylinders. The invention may also be applied to engraving systems using flat bases.

A pattern 11 to be reproduced is attached to the scanning cylinder 1 and the pattern may contain continuous tone areas and line areas.

In a continuous-tone area, which contains the images for example, a multiplicity of levels of density are differentiated between "black" and "white". Density jumps or rapid changes occur only at sharp changes in tone density positions. In the area of the texts with texts and line presentations, only two density values such as "black" and "white" are differentiated and steep density jumps or leaps occur at contours.

So as to obtain an image signal, the pattern 11 is scanned by an opto-electrical scanning means 12 dot by dot and line by line along a scanning screen.

The scanning means 12 is moved with a spindle 13 which is threadedly received in the scanning means 12 and a motor 14 drives the spindle to move the scanning means 12 in the direction of arrow 15. The motor 14 is fed power from a motor control stage 16 by a timing pulse sequence $T_2$. The timing pulse sequence $T_2$ is produced by dividing in the divider 17 the frequency $T_0$ from the control oscillator 9 with a dividing factor of $q_2$.

The image signal produced by the image scanning means 12 is supplied to an amplifier 18 where it is amplified and logarithm weighted so that the image signal is proportional to the density of the scanned pattern.

The amplified image signal is supplied from the amplifier 18 to an analog to digital converter A/D 19. The A/D converter 19 may be, for example, a type ADC 8S available from Analog Devices Company. Such converter has a resolution of 8 bits such that an analog image signal changing from zero (black) to the maximum value (white) is digitalized into 256 discrete density values 0 to 255.

The analog to digital conversion of the image signal is controlled by a scanning timing pulse sequence $T_A$ which is supplied to the analog to digital converter 19 at terminal 21 from a divider 20 which has a dividing factor $q_A$ and receives an input from the control oscillator 9. The frequency of the pulse sequence $T_A$ is $f_A$.

The output of the analog to digital converter 19 is fed to a memory system 22 which may be a gradation stage and may be in the form of a programmable read only memory (PROM) in which the digital image values are modified according to a predetermined gradation function.

The gradations are stored in the form of digital values under the associated addresses in the read only memory 22. Frequently, the image signal also is logarithm weighted in the gradation phase. The read only memory 22 is programmed with a sum total function formed from the logarithm and gradation function and the logarithmation in the amplifier 18 is eliminated when such sum total function occurs in the memory 22.

The change of the image signal according to a gradation function, for example, has the task of adapting the density range of the original to the constricted density range of the print. In this case, change of the image signal means that the image signal x is converted according to a function g into the modified image signals y according to the equation $Y = g(x)$, whereby g represents the gradation function.

The gradation function can be simulated at a function generator in the form of a diode/resistor network or, on the other hand, can be programmed into a memory 22. In this case, the image signal values x address the memory and the modified image values y allocated and stored according to the function are read out of the memory.

In order to change scale between the pattern and the reproduction, the memory system 22 is designed for example, according to the system described in U.S. Pat. No. 3,272,918. The relationship between writing and reading timing then determines the reproduction scaling.

In order to provide electronic compensation for different diameters of scanning and printing cylinders in the reproduction on a scale of 1:1 the memory system 22 may be designed for example according to the disclosure in U.S. Pat. No. 4,013,829.

It is also possible to store in the memory system 22 the binary data of the total pattern which can be read out in a time-staggered manner or can also be provided at different locations for the control of the engraving means.

The digital image values read out of the memory are reconverted in the digital to analog converter 23 into an analog image signal.

The image signal is supplied from the analog to digital converter 23 to an engraving amplifier 24 where it is superimposed upon a screen signal from a screen signal generator 30 and the combination signal is fed to an electro-magnetic engraving means 25 provided with an engraving pin as a cutting tool which executes the engraving of the cups on the printing cylinder 2.

A spindle 26 and a motor 27 move the engraving means 25 parallel with the printing cylinder 2 axis in the direction of arrow 28. The motor 27 receives an input signal from the motor control 29 which receives an incoming timing pulse signal $T_2$ from the divider 17.

The screen generator 30 produces a screen signal in the form of an AC voltage at a frequency of $f_G$. The AC voltage, which may have a sinusoidal or sawtooth shape, for example, corresponds to the printing screen to be engraved. The screen generator 30 is controlled by a timing pulse sequence $T_3$, which is generated from the timing pulse sequence $T_0$ of the oscillator 9 by means of a divider 32 having the dividing factor $q_3$.

The phase relationship between the timing pulse sequence $T_3$ and screen signal may be adjusted to any desired phase shift $\phi_0$.

The form and size of the control signal determine the form and size of the engraving pin motion; in other words, the actual motion of the engraver pin is composed of a motion component determined from the screen signal and of a motion component determined from the image signal.

However, it has proven expedient to consider the two motion components separately. The sinusoidal screen signal by itself causes a sinusoidal engraver motion, whereby the amplitude of the screen signal is set such manner that the engraver does not penetrate (or barely) into the surface of the printing form. In this case, the image signal is added to the screen signal and alone determines the penetration depth of the engraver into the printing form and, thus, the tone value engraved.

The addition of screen signal and the image signal, however, merely means that the screen signal is superimposed on the image signal.

In the invention, the pattern 11 is scanned in the scanning direction according to a scanning screen which is finer than the printing screen so that a more accurate determination of the position of tone density or substantial changes in density are recognized several image data because the frequency of sampling is high.

In the invention, the pattern 11 is scanned in the scanning direction according to a scanning screen which is finer than the printing raster, whereby more image values are derived from the pattern than cups are to be engraved. Therefore on the one hand accurate determination of the position of edges or substantial changes in density are recognized and on the other hand the depth of the cups to be engraved can be determined more accurately by processing several image values for each cup.

In the invention, the scanning fineness has been selected to be twice as high so that for each cup or depression to be engraved, and two different brightness informations staggered in time are obtained. The principle image values represent the brightness information of the image points in the pattern geometrically associated with the cups or depressions in the printing screen to be recorded and the intermediate image values represent the brightness information scanned between those image dots. Thus, in the invention the frequency of sampling increases the available data.

The higher resolution in the scanning direction is accomplished in the invention by utilizing a frequency of $f_A$ of the scanning timing pulse sequence $T_A$ which is higher than the frequency $f_G$ of the screen signal.

Generally, the relationship between the frequency $f_A$ of the scanning pulse timing sequence $T_A$ and the frequency $f_G$ of the screen signal is given by the equation $f_A = n \times m \times f_G$ where "n" determines the fineness of the scanning and "m" is a constant of proportionality.

Since the scanning fineness in the present embodiment is "2" and since no change of scale is assumed to be taking of place and the cylinders have identical diameters, $n = 2$ and $m = 1$.

To obtain the intermediate image values, it would be possible to also provide for a second analog to digital converter with a corresponding timing sequency control. Also, the pattern 11 could be scanned with a photo diode array oriented in the scanning direction whereby the image signals would have to be intermediately stored.

Because the scanning timing sequence $T_A$ and the screen signal are derived from a single common control oscillator 9, both signals will have a fixed phase relationship such that the timing and phasing of the timing sequency $T_A$ and the instances for the analog-digital conversion of the image signal fall into the periodically recurring amplitude values of the screen signal. Thus, in the invention the engraver cuts at phase shifted positions because the frequency of sampling has increased and when substantial changes in density occur the engraver will receive a phase shifted screen signal based on intermediate values.

The system according to the present invention has the following advantages. It is known that an electromagnetic engraving means comprises a low pass filter characteristic which determines the transfer characteristic or the interacting of the input signal and the movement of the engraving needle. With an image signal jump, the engraving needle moves to its theoretical position determined by the new image signal value and engraves a cup of a depth associated with the signal but there is a predetermined time lag that occurs between the occurrence of the signal and the movement of the engraving needle. By superimposing the large image signal amplitude changes jumps of one tone density level which are controlled relative to the phase position of the screen signal, it becomes possible according to the invention to control the time of moving into and leaving the cups of the engraving needle in the printing form and its penetration depth in the engraving of the cups so that a shift in position of the cups is accomplished relative to the printing screen which is used for obtaining improved reproduction of the tone density jumps.

In the case of a large density change in the pattern, the associated large image signal amplitude change is divided in the invention in two partial leaps or jumps which are superimposed consecutively within one period over the screen signal. Thereby, intermediate image values indicate the "trend" for the direction of movement of the engraving needle to which it is deflected by the subsequent principle image value due to the high frequency of sampling.

Figure 3A:
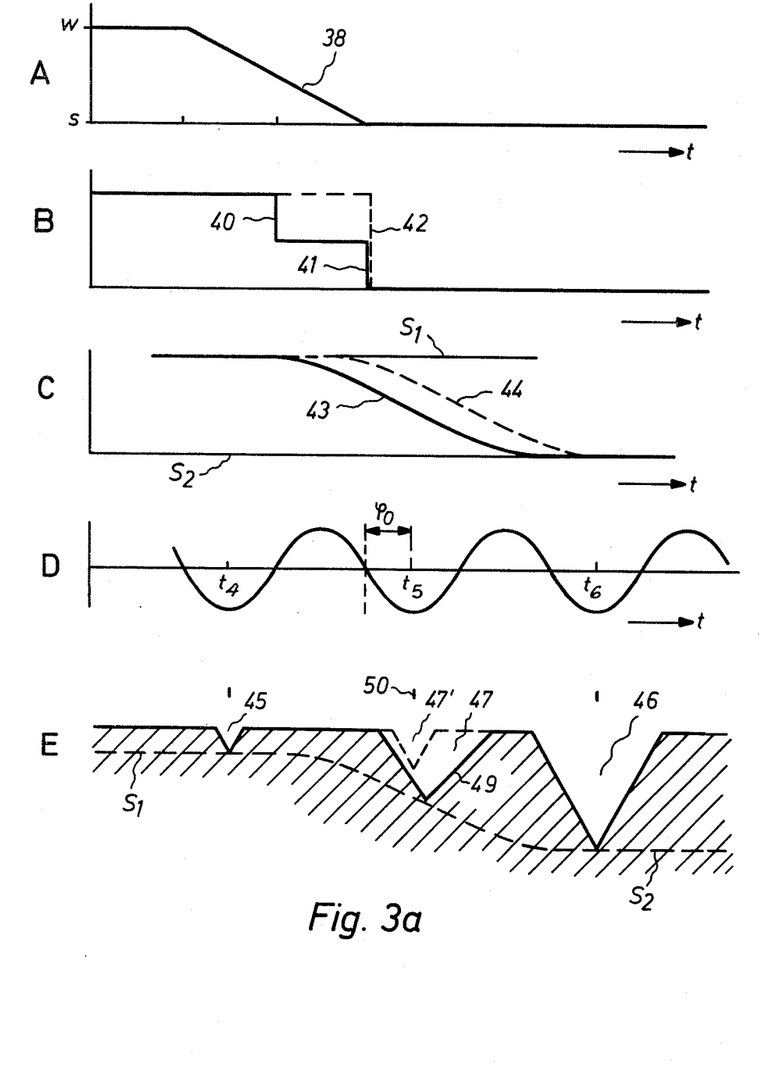
FIG. 3a is a plot of the image signal.
Figure 3B:
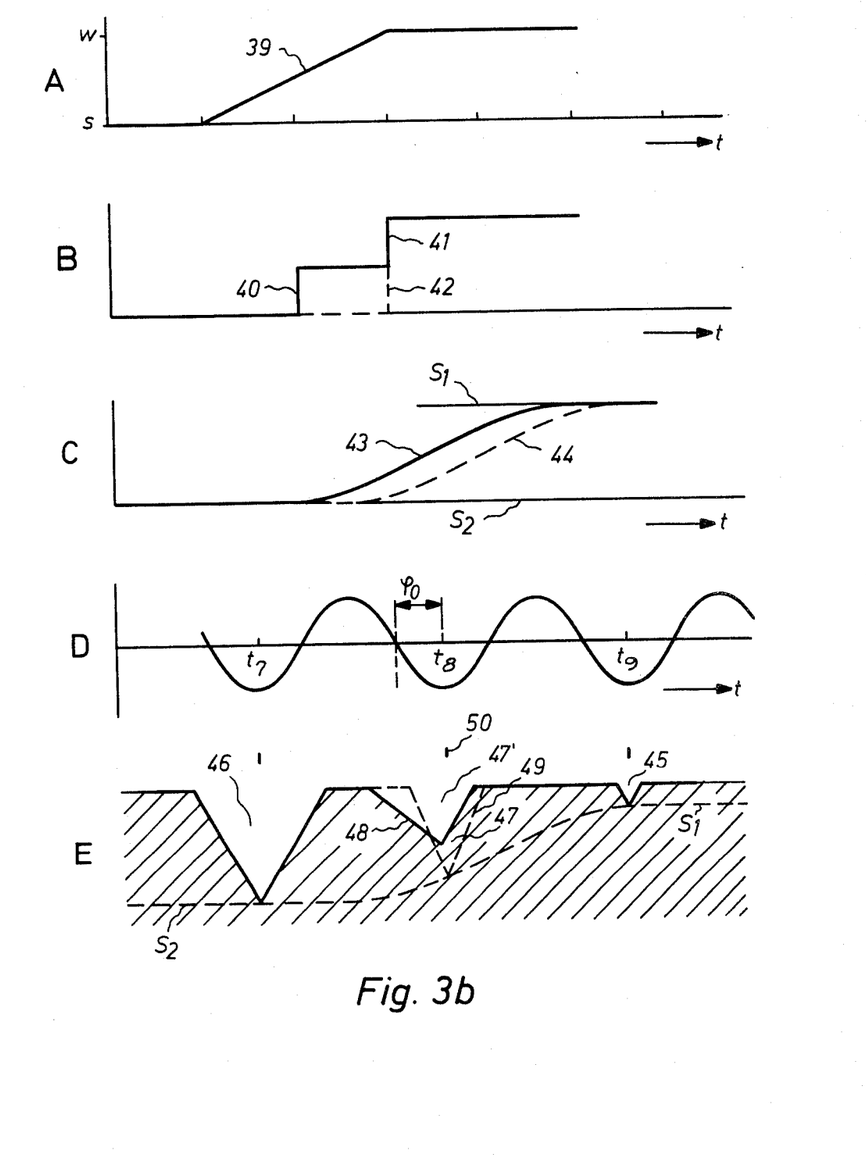

The phase shifting of the engraving of the cups occurs such that cups having sizes which correspond to intermediate values between two adjacent density levels at one sharp change in tone density are pressed more tightly against those cups which represent the higher density level as shown in greater detail in FIGS. 3a and 3b.

In a preferred embodiment, a constant phase shift occurs between the screen signal and the scanning pulse timing sequence $T_A$ so that when scanning occurs the image signal smplitude will be phase shifted and to control the engraving of a cup.

The engraver pin with an image signal amplitude change achieves its position prescribed by the new image signal value after a specific time delay which is determined by the magnet driving system.

Due to this delay time, in traditional engraving systems a contour is not exactly reproduced. According to the invention, however, the contour reproduction is significantly improved by means of a phase shift and superimposition of the image signal amplitude changes on the screen signal. The phase shift $\phi_0$ is selected to be approximately equal to the inertia of the engraving member.

Figure 2:
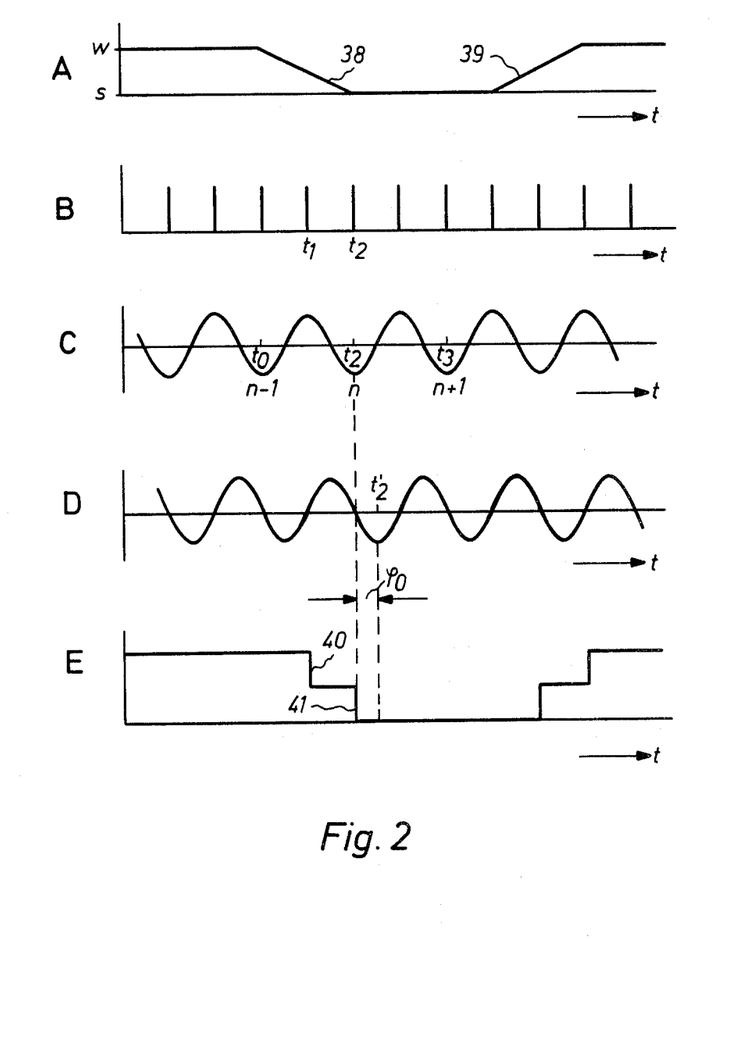
FIG. 2A is a plot of an arbitrary image signal relative to time in which the high level represents the tonal value "white" and the low value indicates the tonal value "black".
FIG. 2B is a plot of the scanning time pulse sequence $T_A$.
FIG. 2C is a plot of the screen signal.
FIG. 2D is a plot of a screen signal which is shifted in phase relative the screen signal illustrated in FIG. 2C.
FIG. 2E is a plot of the reconverted analog image signal superimposed on the screen signal.

FIG. 2 illustrates different signals relative to time.

FIG. 2A is a plot of an arbitrary image signal shape relative to time obtained during the scanning of an image line whereby the high level signal indicates the tonal value "white" and the low signal value indicates the tonal value of "black". The image signal plot illustrates a black/white transfer 39 and a white/black transfer 38.

FIG. 2B illustrates the scanning timing pulse sequence $T_A$ at which the analog-digital conversion of the image signal is accomplished.

FIG. 2C illustrates the screen signal as an AC voltage. A cup is engraved in each case during the minimum of the AC voltage for example at time $t_2$ the n-th cup would be engraved.

The frequency $f_A$ of the scanning timing pulse sequence $T_A$ is selected to be twice the frequency $f_G$ of the screen signal so that two periods of the scanning timing pulse sequence $T_A$ are produced for each period of the screen signal.

At time $t_1$, the intermediate image value is determined and at time $t_2$ the principle image value of the n-th cup is determined during the transfer 38.

FIG. 2D illustrates a screen signal which is shifted in phase relative to the scanning timing pulse sequence $T_A$ by the phase angle of $\phi_0$.

FIG. 2E illustrates the reconverted image signal. The large amplitude changes of the image signal between "white" and "black" produced at the scanning of the transfer 38 is divided into two smaller partial changes 40 and 41 which are superimposed on the screen signal for the engraving.

In the event of constant phase shift $\phi_0$ of the screen signal, the second partial jump 41 is also superimposed at time $t_2$, but the n-th cup is engraved only at the later time of $t'_2$.

FIGS. 3a and 3b illustrate in greater detail the invention and show the signal changes the movement of the engraving needle and the engraving of the cups when producing a sharp change in tone density.

FIG. 3a illustrates a signal generated for a black/white transfer 38. The timing signal for the analog to digital conversion of the image signal are indicated on the time axis with little dashes.

In the case of a constant phase shift $\phi_0$ between the screen signal and the scanning timing pulse sequence as illustrated in FIG. 2D, the partial jumps are superimposed onto the raster signal consecutively at the times $t_1$ and $t_2$ with regard to the scanning timing pulse sequence, but the cup is engraved with a time delay at the engraving time $t'_2''$.

FIGS. 3a and 3b explain the difference between the invention and the traditional engraving technology (prior art) which is respectively indicated with a broken line.

In the prior art, the full image signal jump 42 (diagram B) occur at a contour 38 and the engraver moves on the track 44 (diagram C) and engraves the cup 47' (diagram E).

In the invention on the other hand, the two partial jumps 40 and 41 (diagram B) occur at the contour 38, and the engraver moves on the track 43 (diagram C) and engraves the cup 47 (diagram E).

In comparison to the cup 47', the cup 47 now has the exact cut depth and is phase displaced for the purpose of contour improvement. In the sense of determining the transfer function of a system, here the electromagnetic engraving element, the motion course of the engraver illustrated in diagram C is the step response to the input signal step. It can be seen by comparing diagrams B and C, as already described in detail, that the engraver follows the image signal with a time delay or phase shift.

In contrast to FIG. 2, in which only electrical signal paths are shown, FIG. 3 additionally shows the motion for the engraver (diagram C).

Given an image signal jump (40; 41; 42), the engraver does not jump but, due to the inertia of the engraving element, moves gradually from the level $S_1$ to the level $S_2$, i.e., the engraver only reaches the level $S_2$ corresponding to the tone value "black" after a specific time delay after the image signal change to "black". For this reason, the engraving of the corresponding cup also occurs with a certain delay, as can be seen by comparing diagrams B and E.

FIG. 3a B illustrates the analog image signal which results after reconverting the digital image values to said analog image signal. In case of an edge in the image a complete image signal jump 42 occurs, when scanning the image by prior art method, but the partial jumps 40 and 41 occur, when scanning the image according to the invention. The complete signal jump 42 is indicated in broken line.

FIG. 3a D illustrates the screen signal which has the phase shift $\phi_0$ or the movement of the engraving needle resulting from the screen signal without considering the image signal.

FIG. 3a E comprises a developed section through the surface layer of the printing form along a circumferential line in the area of an edge.

As it can be seen from C there is a time delay or phase shift between the image signal and the movement of the engraving needle. Therefore the cups representing the edge 38 are engraved with a time delay with respect to the image signal jumps.

During the transfer range of the edge in the image between "white" and "black" a first cup 45 is engraved with a tonal value "white" at time $t_4$, a second cup 47 (47') is engraved at time $t_5$ with a gray value and a third cup 46 is engraved with a tonal value "black" at the time $t_6$.

As explained before the movement of the engraving needle arises due to superposition of a first partial movement (FIGS. 3a C) depending on the path of the image signal and a second partial movement (FIG. 3a D) depending on the path of the screen signal.

Therefore taking into account the different paths 43 and 44 of the engraving needle between "white" and "black" two cups 47 and 47' are engraved which differ in depth and shape.

In the case of the complete image signal jump 42 the cup 47' is engraved according to the prior art traditional method and in the case of the partial leaps 40 and 41 the cup 47 is engraved according to the invention. As a result of path 43 the engraving needle remains longer in the material during engraving the cup 47. The pull-out of the engraving needle illustrated by surface 49 has a flatter path than normal so that the position of the cup 47 is shifted relative to the printing screen, which is indicated relative to markings 50, in the direction toward the darker tonal values of the edge, whereby a sharper edge reproduction results. To illustrate the improvement the position of the cup 47' engraved according to prior art method is within the printing screen and no sharper edge reproduction results. In addition the cup 47 attains its theoretical depth in comparison with the depth of cup 47' so that a real tonal value would result.

At time $t_0$, a cup 45 is engraved with the tonal value "white" and at time $t_2$, a cup 46 is engraved with the tonal value "black". During the transfer range between "white" and "black", a cup 47 is produced with a gray value. As a result of the higher sampling changes 40 and 41 of the image signal occur and, the engraving needle remains longer in the material during the engraving of the cup 47 so that the pull-out of the engraving needle illustrated by surface 49 has a flatter path than normal. The markings 50 which identify the printing screen and the cup 47 is shifted in the direction towards the darker tonal values of the sharp change in tone density relative to a markings 50 such that the sharper change in tone density reproduction results.

To illustrate the improvement, a cup 47' is shown as it would be produced according to a prior art traditional engraving method with a complete image signal jump 42. The cup 47' has no improvement for sharp tone density changes and attains a depth such that an adulterated tonal value would result.

FIG. 3b (A-E) are curves for illustrating the process for a black/white transfer. The curves in FIG. 3b A, B, C, D and E correspond to those in FIGS. 3a (A-E) and it is to be noted that on the basis of the partial jumps 40 and 41 the cup 47 is engraved with a flatter inward movement 48 and a steeper outward movement 49 of the engraving needle so that the cup 47 is shifted in the direction of the darker tonal values of the sharp tone density changes as can be seen when it is compared with the prior art cup 47' which would result if the two step method of the invention were not utilized.

Figure 4:
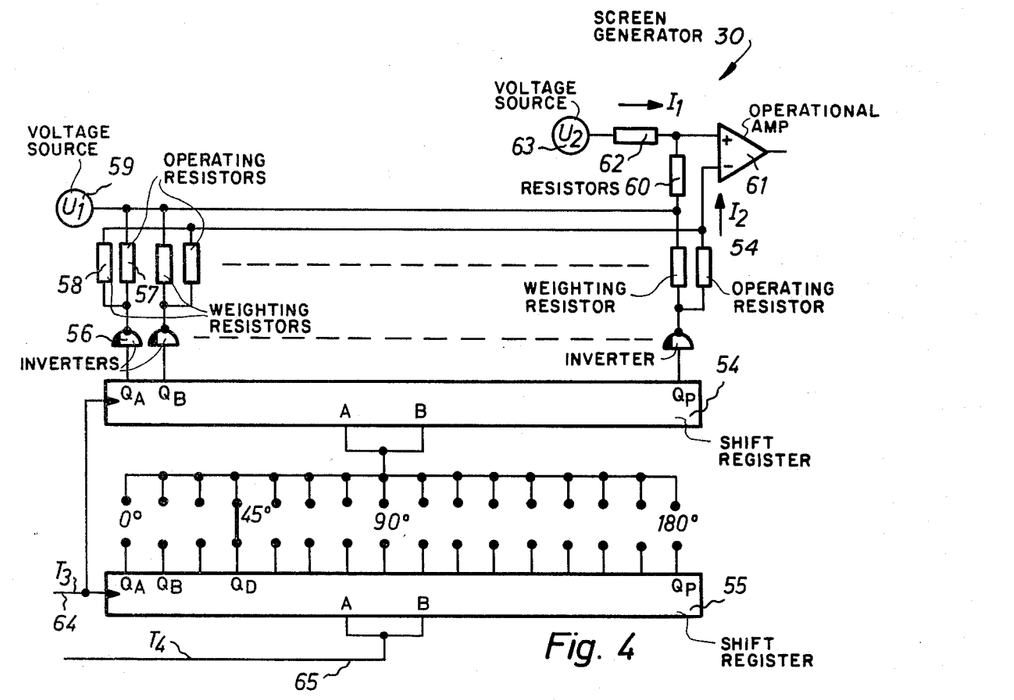
FIG. 4 illustrates a screen generator.

FIG. 4 illustrates the screen generator 30 shown in FIG. 1. The screen generator 30 converts the timing pulse sequence $T_3$ into a sinusoidal AC voltage which is utilized as the screen signal. The screen generator 30 comprises two sixteen stages shift register 54 and 55 which can be constructed of eight bit shift registers type SN74198.

Each output $Q_A$ to $Q_P$ of the shift register 54 is associated with a corresponding inverter 56 which invert the output of the shift register 54. Each of the inverters 56 are connected to operating resistors 57 and weighting resistors 58 which are weighted according to a sine function. The voltage source $U_2$ with the resistors 60 and 62 serve to adjust the offset voltage of the operational amplifier 61. The load and weighing resistors are used to provide the proper coupling. The resistors 57 are connected to a voltage source 59 and the voltage source 59 is connected by way of a resistor 60 to the non-inverting input of an operational amplifier 61. The weighting resistors 58 are jointly connected together at their second sides and to the inverting input of the operational amplifier 61. An additional voltage source 63 provides a current $I_1$ through resistor 62 to the non-inverting input of the operational amplifier 61.

The sinusoidal A.C. voltage is produced at the output of the operational amplifier 61. The sinusoidal voltage can be smoothed by frequency dependent feedback which suppresses high frequency components.

The timings sequence $T_3$ on cable 64 is utilized as a shift timing sequence for the shift registers 54 and 55 as shown.

The preparation inputs A/B of the shift register 55 receive the timing sequence $T_4$ on cable 65 and the timing sequence $T_4$ has a frequency of $f_4$ corresponding to the frequency $f_G$ of the sinusoidal AC voltage of the screen signal.

In the embodiment of the invention, $f_3$ is equal to $32 \times f_4$ so that one period of the AC voltage is composed of 32 different increments.

The outputs $Q_A$ through $Q_P$ of the shift register 55 are selectably connectable to the preparation inputs A/B of the shift register 54.

As a result, the phase position of the AC voltage can be shifted relative to the timing sequence $T_4$ from 0° to 180° in 16 phase shifts with one phase shift corresponding to the timing period of $T_3$.

The control shift sequence $T_3$ shifts the clock pulses of the timing sequence $T_4$ through the shift register 55 and in each case after 32 clock pulses of the shift timing, sequence one pass is completed. As a result, a timing sequence $T'_4$, appears at the preparation inputs A/B of the shift register 54 but it is phase shifted by a selected amount relative to the timing sequence $T_4$. For example, if a phase shift of 45° is desired, the output $Q_D$ of the shift register 55 is connected to the preparation input A/B of the shift register 54. The phase shifted timing sequence $T'_4$ is passed by way of the shift register timing sequence $T_3$ though the shift register 54 where after 32 shift steps in each case one passage cycle is completed.

Each output Q of the shift register 54, can assume the logic conditions of "L" and "H". If an "L" signal exists at the output Q a partial current flow through the associated weighting resistor 58 and the amplitude of the current will be a function of the resistor value. The partial currents of all the weighting resistors 58 are superimposed at the inverting input of the operational amplifier 61 into a sum total current $I_2$ which according to the 16 possible conditions of the outputs $Q_A$ through $Q_P$ of the shift register 54 can assume 16 different values so that at the output of the operational amplifier 61 there will be 16 different voltage values that are produced within one-half period of the AC voltage.

When one output Q of the shift register is "L", the output of the appertaining inverter is "H". Since the shift register is operated at the voltage $U_1$, the logical level "H" corresponds to the voltage $U_1$. In this case, a partial current flows through the resistor 58, said partial current being calculated according to the familiar Ohm's law.

Figure 5:
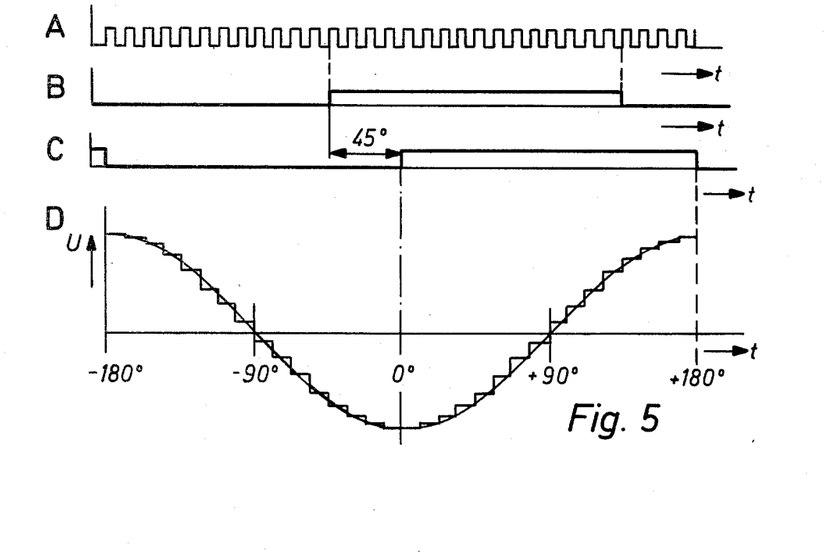
FIG. 5A illustrates the timing sequence pulse train $T_3$ shown in FIG. 4.
FIG. 5B illustrates the timing sequence $T_4$ illustrated in FIG. 4.
FIG. 5C illustrates the phase shifted timing sequence $T'_4$.
FIG. 5D is a plot of the phase shifted sine voltage.

FIG. 5 illustrates four curves A through D plotted against time. "A" illustrates the timing sequence $T_3$. "B" illustrates the timing sequence $T_4$. "C" illustrates the phase shifted timing sequence $T'_4$ and "D" illustrates the plot of the phase shifted sine voltage.

As can be taken from the diagrams of FIG. 2, (A-E) a phase shift $\phi_0$ exists between the scanning time pulse sequence $T_A$, which is represented in FIG. 2B, and the screening signal, in the form of a sinusoidal wave, which is shown in diagram D. The frequency of the scanning time pulse sequence $T_A$ is twice the frequency of the screening signal.

FIG. 1 shows a time pulse generator 9, which generates the scanning time pulse sequence $T_A$ and the time pulse sequence $T_3$ by means of frequency subdivision (20;32). Since these time pulse sequences are obtained in a common master generator, they are synchronous and have no phase shift between them. The time pulse sequence $T_3$ is fed to the screen generator 30, in which the sinusoidal screening signal is derived from the time pulse sequence $T_3$. This sinusoidal screening signal displays the desired phase shift $\phi_0$ with respect to the timing pulse sequence $T_3$, or respectively, with respect to the scanning time pulse sequence $T_A$. The construction of the screen generator 30 and the generation of the phase shifted, sinusoidal AC voltage (screening signal) from the time pulse sequence $T_3$ is explained extensively in description of FIGS. 4 and 5 above and for a phase shift $\phi_0 = 45°$.

FIG. 5A shows the time pulse sequence $T_3$, which pass to the shift register 55 via the line 64.

FIG. 5B shows an auxiliary timing pulse sequence $T_4$, the frequency of which is the same as the desired frequency of the AC voltage. In the embodiment shown for the screen generator, the frequency of the time pulse sequence $T_3$ is 32 times as large as the frequency of the auxiliary time pulse sequence $T_4$. The auxiliary time pulse $T_4$ passes to the A/B preparation input of the shift register 55 via the line 65. In this way, a time pulse of the time pulse sequence $T_4$ which was put into the shift register 55 is passed through the shift register 55 after 32 time pulses of the time pulse sequence $T_3$, and a new time pulse of the time pulse sequence $T_4$ is put in.

A phase shift of $\phi_0 = 15°$ corresponds to the time pulse spacing of the time pulse sequence $T_3$. For the phase shift of $\phi_0 = 45°$ which is assumed in the embodiment example, the output $Q_d$ of the shift register 55 is connected with the A/B preparation inputs of the shift register 54.

Corresponding to the desired phase shift of $\phi_0 = 45°$, a time pulse of the time pulse sequence $T_4$ is passed with four time pulses of the time pulse sequence $T_3$ to the output $Q_d$ of the shift register 55 and from there is fed into the shift register 54. The time pulse is passed through the shift register 54 with 32 time pulses of the time pulse sequence $T_3$. The outputs of the shift register 54 one after another assume the logic state "H", as a result of which the resistance which are weighted according to the sine function (57;58) are activated also one after another. In this manner, within 16 time pulses of the time pulse sequence $T_3$ (diagram A), or respectively, within a half period of the time pulse sequence $T_4$ (diagram B), 16 stepped values of the sine function are formed at the output of the operational amplifier 61. The sine function which is generated corresponds to the desired sinusoidal screening signal which is represented in diagram D.

The phase shift feature is essential to the invention, but the circuit for carrying this out can vary. The arrangement which is shown is an embodiment example and other circuits are possible.

As seen from the diagram of FIG. 2, the phase shift $\phi_0$ between the screening signal (diagram D) and the scanning time pulse sequence $T_A$ (diagram B) exists continuously, and not only in the case of an edge in the original. What is important is that the phase shift according to the invention acts in a particularly favorable manner upon the engraving of edges to give a sharp edge reproduction, since an image signal jump occurs at an edge, that is, at a jump in density (FIG. 2E;40;41). The favorable behavior of the engraving instrument because of the phase shift is shown in FIGS. 3a and 3b.

Although the invention has been described with respect to preferred embodiments, it is not to be limited as changes and modifications can be made which are within the full intended scope of the invention as defined by the appended claims.

I claim as my invention:

1. A method for improved reproduction of edges in originals during the engraving of screened printing forms, wherein an engraving tool of an electromagnetic engraving member controlled by an engraving signal cuts a plurality of cups arranged in a printing screen into said printing forms, the method comprising the steps of:
   (a) generating a screen signal which represents the printing screen, supplying said screen signal to an engraving tool and said screen signal causes an oscillating movement of said engraving tool at the frequency of the screen signal, whereby the engraving tool in each case effects its largest deflection in the direction of the printing form at a periodically recurrent amplitude value of the screen signal,
   (b) scanning the original image point by point to obtain an analog image signal,
   (c) converting said analog image signal to a digital image signal,
   (d) sampling said image signal at a frequency which is higher than the frequency of the screen signal to obtain digital principal image values corresponding to the first image points in the original and additional intermediate digital image values corresponding to image points of the original lying between said first image points in the scanning direction,
   (e) reconverting said principal digital image values and said intermediate digital image values into an analog image signal, whereby a single signal jump which occurs during scanning an edge in the original is divided up into consecutive partial signal jumps, said reconverted image signal determining the depth of the cups to be engraved and the density level to be reproduced,
   (f) superimposing said reconverted analog image signal onto said screen signal to obtain said engraving signal such that the partial signal jumps associated with the principal image values are superimposed at the instants of the recurrent amplitude values of the screen signal, whereby the cups representing an edge in the original are phase shifted relatively to the printing screen toward the higher level of density so as to accomplish improved reproduction of edges.

2. The method according to claim 1, wherein the digital image signal is stored in a memory between scanning and recording, and wherein the principal image signal is read out from said memory and then superimposed onto the screen signal at the times of the recurrent amplitude values of said screen signal.

3. The method according to claim 1 wherein the recurrent amplitude value of the screen signal corresponds to a peak value of the screen signal.

4. The method according to claim 1, wherein the scanning timing pulse sequence and the recording timing pulse sequence are derived from a common timing pulse sequence by frequency conversion.

5. The method according to claim 1 wherein the screen signal is derived from a recording timing pulse sequence.

6. The method according to claim 5, wherein the lead time is accomplished by shifting the phase position of the screen signal relative to the recording timing pulse sequence.

7. A method for improved reproduction of edges in originals during the engraving of screened printing forms, wherein an engraving tool of an electromagnetic engraving member controlled by an engraving signal cuts a plurality of cups into said printing forms, the method comprising the steps of:
   (a) generating a screen signal which represents the printing screen and said screen signal causes an oscillating movement of said engraving tool at the frequency of the screen signal, whereby the engraving tool in each case has its largest deflection in the direction of the printing form at a periodically recurrent amplitude value of the screen signal,
   (b) scanning the original image point by point to obtain an analog image signal,
   (c) converting said analog image signal to a digital image signal,
   (d) sampling said image signal at a frequency which is higher than the frequency of the screen signal to obtain principal digital image values corresponding to first image points in the original and additional intermediate digital image values corresponding to image points of the original lying between said first image points in the scanning direction,
   (e) reconverting said principal image values and said intermediate image values into an analog image signal, whereby a single signal jump which occurs during scanning an edge in the original is divided up into consecutive partial signal jumps, said reconverted image signal determining the depth of the cups to be engraved respectively the level of density to be reproduced,
   (f) superimposing said reconverted analog image signal onto said screen signal to obtain said engraving signal in such a relation that the partial signal jumps associated with the principal image values are phase shifted to lead in time relative to the recurrent amplitude values of said screen signal, whereby the cups representing an edge in the original are shifted relatively to the printing screen toward the higher level of density so as to accomplish improved reproduction of edges.

8. The method according to claim 7, wherein the lead time is selected to be approximately equal to the buildup time of the tool of the electro-magnetic engraving means determined by its inertia when actuated by a jump in the image signal caused by scanning an abrupt change in tone density.

9. The method according to claim 7, wherein the digital image signal is stored in a memory between scanning and recording, and wherein the principal image signal is read out from said memory and then superimposed onto the screen signal at times which lead the recurrent amplitude values of said screen signal.

10. The method according to claim 9, wherein the lead time is selected to be approximately equal to the buildup time of the tool of the electro-magnetic engraving means determined by its inertia when actuated by an abrupt change in the image signal caused by scanning an abrupt change in tone density.

* * * * *